(12) United States Patent
Ho

(10) Patent No.: US 11,125,883 B2
(45) Date of Patent: *Sep. 21, 2021

(54) EFFICIENT AND SCALABLE THREE-DIMENSIONAL POINT CLOUD SEGMENTATION

(71) Applicant: APEX.AI, INC., Palo Alto, CA (US)

(72) Inventor: Christopher Ho, San Francisco, CA (US)

(73) Assignee: APEX.AI, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,834

(22) Filed: Feb. 2, 2021

(65) Prior Publication Data

US 2021/0223401 A1 Jul. 22, 2021

Related U.S. Application Data

(63) Continuation of application No. 16/375,747, filed on Apr. 4, 2019, now Pat. No. 10,921,455.

(Continued)

(51) Int. Cl.
*G06K 9/00* (2006.01)
*G01S 17/931* (2020.01)
(Continued)

(52) U.S. Cl.
CPC ............ *G01S 17/931* (2020.01); *G01S 17/89* (2013.01); *G05D 1/024* (2013.01); *G06T 7/136* (2017.01);
(Continued)

(58) Field of Classification Search
CPC ....... G01S 17/931; G01S 17/89; G06T 7/136; G06T 7/187; G06T 2207/30252;
(Continued)

(56) References Cited

U.S. PATENT DOCUMENTS 5,911,767 A * 6/1999 Garibotto ............. G05D 1/0272
701/28
2011/0282581 A1* 11/2011 Zeng ..................... G01S 7/4808
701/301

(Continued)

OTHER PUBLICATIONS

Zermas et al, ("Fast Segmentation of 3D Point Clouds: A Paradigm on LiDAR Data for Autonomous Vehicle Applications", 2017 IEEE, pp. 5067-5073) (Year: 2017).*

(Continued)

*Primary Examiner* — Amara Abdi
(74) *Attorney, Agent, or Firm* — Procopio, Cory, Hargreaves & Savitch LLP

(57) ABSTRACT

Efficient and scalable three-dimensional point cloud segmentation. In an embodiment, a three-dimensional point cloud is segmented by adding points to a spatial hash. For each unseen point, a cluster is generated, the unseen point is added to the cluster and marked as seen, and, for each point that is added to the cluster, the point is set as a reference, a reference threshold metric is computed, all unseen neighbors are identified based on the reference threshold metric, and, for each identified unseen neighbor, the unseen neighbor is marked as seen, a neighbor threshold metric is computed, and the neighbor is added or not added to the cluster based on the neighbor threshold metric. When the cluster reaches a threshold size, it may be added to a cluster list. Objects may be identified based on the cluster list and used to control autonomous system(s).

20 Claims, 10 Drawing Sheets

Related U.S. Application Data

(60) Provisional application No. 62/653,438, filed on Apr. 5, 2018.

(51) Int. Cl.
    *G06T 7/136*     (2017.01)
    *G06T 7/187*     (2017.01)
    *G05D 1/02*     (2020.01)
    *G01S 17/89*     (2020.01)

(52) U.S. Cl.
CPC ..... *G06T 7/187* (2017.01); *G05D 2201/0213* (2013.01); *G06T 2207/10028* (2013.01); *G06T 2207/30252* (2013.01)

(58) Field of Classification Search
CPC .......... G06T 2207/10028; G05D 1/024; G05D 2201/0213
See application file for complete search history.

(56) References Cited

U.S. PATENT DOCUMENTS

| | | |
|---|---|---|
| 2013/0151210 A1 | 6/2013 | Kallay et al. |
| 2013/0263151 A1 | 10/2013 | Li et al. |
| 2013/0321419 A1 | 12/2013 | Stein |
| 2014/0258295 A1 | 9/2014 | Wang et al. |
| 2015/0081156 A1 | 3/2015 | Trepagnier et al. |
| 2016/0275719 A1* | 9/2016 | Oke ................ G06T 17/005 |
| 2017/0220887 A1 | 8/2017 | Fathi et al. |
| 2018/0128628 A1* | 5/2018 | Cheaz ................ H04W 84/00 |
| 2018/0144202 A1* | 5/2018 | Moosaei ................ G06T 7/90 |

OTHER PUBLICATIONS

Bogoslavskyi et al., "Fast Range Image-Based Segmentation of Sparse 3D Laser Scans for Online Operation" (2016) 163-169, IEEERSJ International Conference on Intelligent Robots and Systems (IROS), DOI: 10.1109IROS.2016.7759050, in 7 pages.

Nguyen et al., "3D point cloud segmentation: A survey" 2013) 225-230, IEEE Conference on Robotics, Automation and Mechatronics, RAM—Proceedings, DOI: 10.1109RAM.2013.6758588, in 6 pages.

Rusu, "Semantic 3D Object Maps for Everyday Manipulation in Human Living Environments", (2010) KI—Kunstliche Intelligenz. 24. .sctn. 6.2 DOI: 10.1007s13218-010-0059-6, in 284 pages.

Zermas et al, (Fast Segmentation of 3D Point Clouds: A Paradigm on LiDAR Data for Autonomous Vehicle Applications, 2017 IEEE International Conference on Robotics and Automation (ICRA) Singapore, May 29-Jun. 3, 2017 (Year: 2017).

International Search Report and Written Opinion dated Jul. 9, 2019 for related International Application No. PCTUS2019025856 in 17 pages.

\* cited by examiner

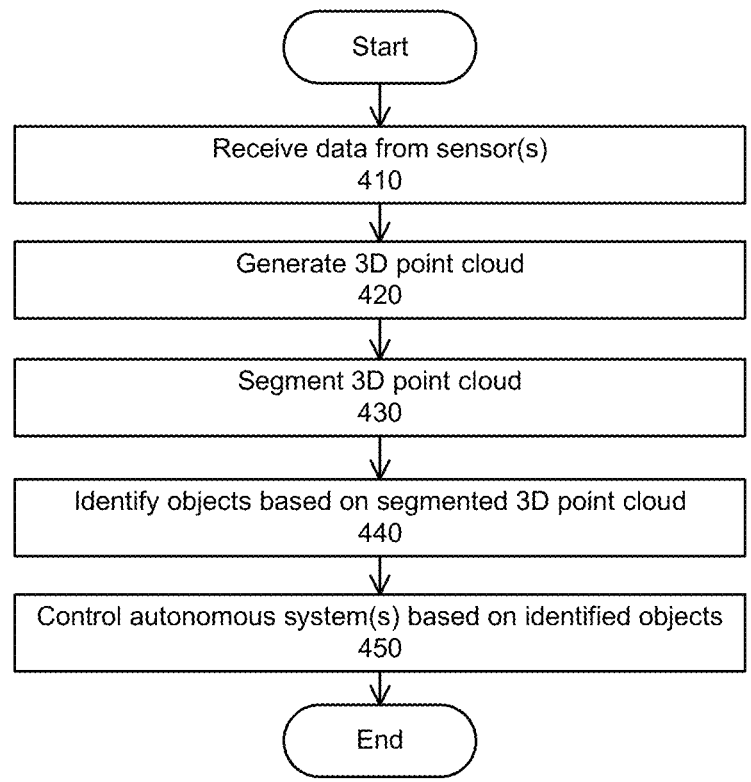

430

EFFICIENT AND SCALABLE THREE-DIMENSIONAL POINT CLOUD SEGMENTATION

CROSS-REFERENCE TO RELATED APPLICATIONS

This application is a continuation of U.S. patent application Ser. No. 16/375,747, filed on Apr. 4, 2019, which claims priority to U.S. Provisional Patent App. No. 62/653,438, filed on Apr. 5, 2018, which are both hereby incorporated herein by reference as if set forth in full.

BACKGROUND

Field of the Invention

The embodiments described herein are generally directed to three-dimensional (3D) point cloud segmentation, and, more particularly, to an efficient and scalable clustering algorithm for 3D point cloud segmentation, for example, in the context of autonomous vehicles (e.g., for navigation).

Description of the Related Art

Any autonomous vehicle requires sensing and processing to understand its environment so that it can safely navigate the world. This requires an understanding of where the free space is within the vehicle's environment, which, in turn, requires an understanding of what objects are within the environment and where those objects are located within the environment. This sensing of the vehicle's environment is typically done using cameras, radars, or, most recently, light detection and ranging (Lidar) sensors (e.g., laser radars or laser scanners, also referred to sometimes as "LIDAR," "LiDAR," and "LADAR"), to generate an accurate 3D representation of the environment. This 3D representation of the environment is referred to as a "3D point cloud," and may comprise a list of points, each having x, y, and z coordinates.

FIG. 1A illustrates an example of a Lidar sensor. Specifically, FIG. 1A illustrates the VLP-16 Puck™, manufactured by Velodyne LiDAR of San Jose, Calif. Another example of a Lidar sensor is the M8 from Quanergy Systems, Inc. of Sunnyvale, Calif. Lidar works by illuminating surfaces with pulsed laser light, and measuring the reflected pulses with the Lidar sensor. The differences in the return times and wavelengths of the laser light are then used to measure the distance to the surfaces and generate the 3D point cloud.

FIG. 1B illustrates an example 3D point cloud. As illustrated, a 3D point cloud is an amorphous blob of thousands to hundreds of thousands of points. Each point represents a point on a reflecting surface of an object. Raw 3D point clouds are very unstructured, containing points that are part of the ground, buildings, vehicles (e.g., cars, trucks, bicycles), pedestrians, and/or any other object within the environment being sensed. Consequently, it is necessary to segment a 3D point cloud into subgroups, such that each subgroup represents a distinct object.

Conventional solutions for segmenting 3D point clouds suffer from one or more issues which make them unsuitable for fast, embedded, multiple-input scenarios. For example, most solutions have linearithmic time complexity (i.e., O(n log n)). See, e.g., "Semantic 3D Object Maps for Everyday Manipulation in Human Living Environments," by Rusu, § 6.2 (2009). This means that the runtime grows much larger as the problem size increases, which prevents the usage of such solutions in high-resolution, high-speed, or real-time applications.

One fundamental issue with 3D point clouds is that points that are more distant from the sensor are, necessarily, farther apart from one another. This causes issues in most algorithms, since, generally, these algorithms only work optimally well for points that are within a small-distance range with respect to the sensor.

Other solutions for segmenting 3D point clouds are not amenable to multiple input sources. See, e.g., "Fast Range Image-Based Segmentation of Sparse 3D Laser Scans for Online Operation," by Bogoslayskyi. In addition, other partial solutions are either noise-sensitive (e.g., non-robust edge-based and seeded-region-growing methods), non-deterministic (e.g., random sample consensus (RANSAC)), which is unsuitable for real-time applications, and/or rely on expensive or unbounded computational procedures. See, e.g., "3D point cloud segmentation: A survey," by Nguyen et al. (2013).

Furthermore, most solutions for segmenting 3D point clouds are not static-memory solutions. Solutions that are not static-memory require upfront project planning and engineering discipline, and are not suitable for embedded or safety-critical application.

In general, conventional solutions for segmenting 3D point clouds can be grouped into three families:

(1) Feature-based solutions. These algorithms are typically too slow to be used for a real-time implementation, which is a core requirement for autonomous vehicles.

(2) Projection-based solutions. These algorithms descend from an original, core algorithm that exists in the open-source Point Cloud Library (PCL) project. While this core algorithm may be able to handle multiple sensor inputs (e.g., through some level of indirection) and a variant or extension of the core algorithm may potentially allow for different distance thresholds, neither algorithm is a static-memory solution. In addition, the core algorithm can only handle a fixed cluster distance threshold, i.e., cannot handle point clouds over wide distance ranges. Furthermore, these algorithms use an ill-suited underlying data structure and are relatively slow.

(3) Range-Image-based solutions. These algorithms operate directly on the input from a Lidar sensor, which allows them to be faster and, for some variations, operate over wide distance ranges. However, because these algorithms operate directly on the sensor output, they cannot be used simultaneously for multiple sensor inputs, thereby rendering them unsuitable for applications that utilize multiple sensors.

Consequently, none of these solutions are able to segment 3D point clouds, in real time, using static memory, while being able to handle multiple inputs simultaneously and handle data over a wide range of distances with respect to the sensor.

SUMMARY

Accordingly, systems, methods, and non-transitory computer-readable media are disclosed for scalable 3D-point-cloud segmentation. In an embodiment, the described solution segments 3D point clouds, in real time, while being static-memory (i.e., only requiring a fixed, maximum amount of memory, so as to be suitable for embedded and safety-critical applications), able to handle multiple inputs simultaneously, and/or able to handle data over a wide range of distances with respect to the sensor.

In an embodiment, a method is disclosed. The method comprises using at least one hardware processor to: receive data from one or more sensors; generate a three-dimensional point cloud from the data received from the one or more sensors; segment the three-dimensional point cloud using a clustering algorithm by adding points from the three-dimensional point cloud to a spatial hash, for each unseen point in the three-dimensional point cloud, generating a new cluster, adding the unseen point to the cluster, marking the unseen point as seen, and, for each point that is added to the cluster, setting the point as a reference point, computing a reference threshold metric for the reference point, identifying all unseen neighbor points to the reference point in the spatial hash, based on the reference threshold metric, and, for each identified unseen neighbor point to the reference point, marking the unseen neighbor point as seen, computing a neighbor threshold metric for the neighbor point, determining whether or not the neighbor point should be added to the cluster based on the neighbor threshold metric, and, when the neighbor point is determined to be added to the cluster, adding the neighbor point to the cluster, and, when a size of the cluster reaches a threshold, adding the cluster to a cluster list, and outputting the cluster list; identify one or more objects based on the cluster list; and control one or more autonomous systems based on the identified one or more objects. The method may further comprise using the at least one hardware processor to, prior to segmenting the three-dimensional point, remove points outside a predefined range from the three-dimensional point cloud. Each point may comprise an x, y, and z coordinate, wherein the x and y coordinates represent a horizontal plane, wherein the z coordinate represents a vertical axis, and wherein removing points outside a predefined range comprises removing all points that have a z coordinate that has a value outside a predefined range of values. The method may further comprise using the at least one hardware processor to, prior to segmenting the three-dimensional point, remove ground points from the three-dimensional point cloud. Adding points from the three-dimensional point cloud to the spatial hash may comprise, for each point in the three-dimensional point cloud: quantizing coordinates of the point; computing a bin identifier for the point; generating a node that represents the point; determining whether or not a list of nodes is associated with the computed bin identifier in an associative mapping; when a list of nodes is determined to be associated with the computed bin identifier in the associative mapping, adding the generated node to the list of nodes associated with the computed bin identifier; and, when a list of nodes is not determined to be associated with the computed bin identifier in the associative mapping, adding a new list to the associative mapping in association with the computed bin identifier, and adding the generated node to the new list. Identifying all unseen neighbor points to the reference point in the spatial hash, based on the reference threshold metric, may comprise: quantizing coordinates of the reference point; quantizing the reference threshold metric into a distance metric; generating an overestimated bin set of bins that are within the distance metric from the quantized coordinates of the reference point; and, for each bin in the overestimated bin set, determining whether or not a best distance of the bin from a reference bin, comprising the reference point, is less than the distance metric, and, when the best distance of the bin from the reference bin is determined to be less than the distance metric, for each point in the bin, determining whether or not a distance between the point in the bin and the reference point is less than the reference threshold metric, and, when the distance between the point in the bin and the reference point is determined to be less than the reference threshold metric, identifying the point in the bin as a neighbor point to the reference point. The one or more sensors may comprise a plurality of sensors. The one or more sensors may comprise a light detection and ranging (Lidar) sensor. The one or more autonomous systems may be comprised in a vehicle, and may comprise a braking system for applying brakes to one or more wheels of the vehicle, a steering system for steering one or more wheels of the vehicle, and/or an acceleration system for throttling an engine of the vehicle. The one or more autonomous systems may be comprised in a robot. The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 4 illustrates a process in which the 3D-point-cloud segmentation is performed, according to an embodiment;

DETAILED DESCRIPTION

In an embodiment, systems, methods, and non-transitory computer-readable media are disclosed for scalable 3D-point-cloud segmentation. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Example Processing Device

Figure 1A:
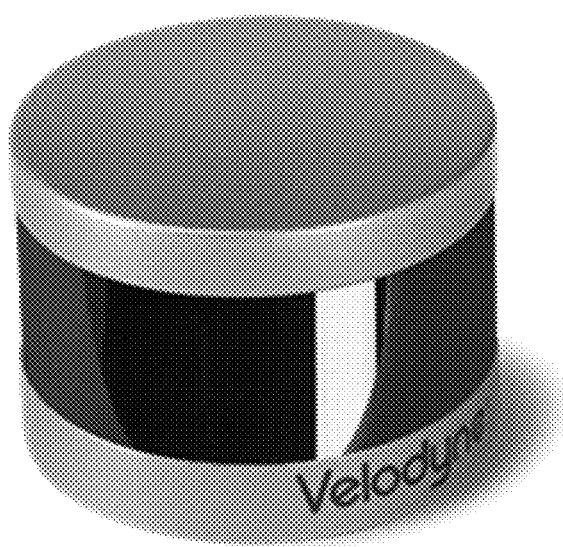
FIG. 1A illustrates an example of a Lidar sensor, according to an embodiment.
Figure 1B:
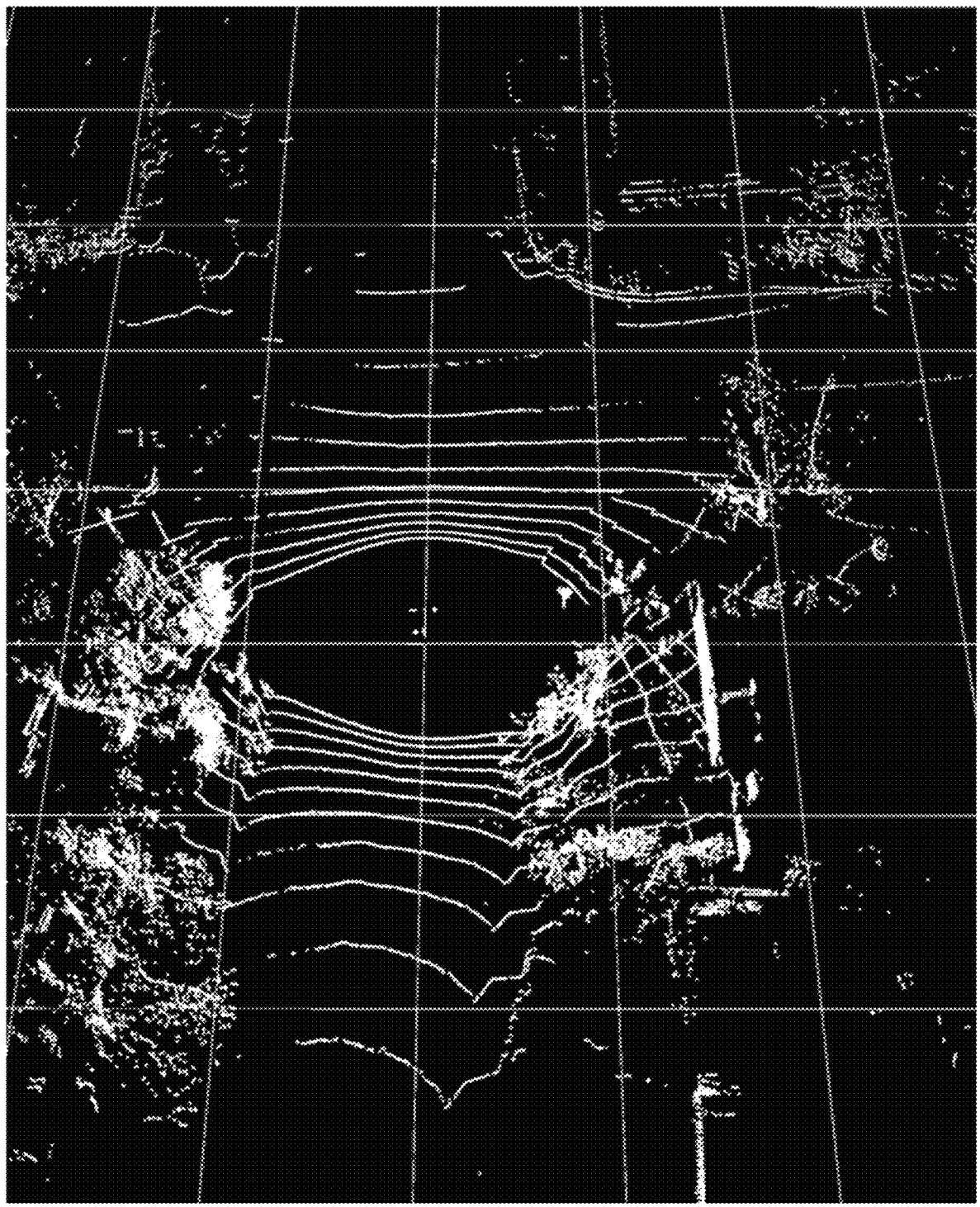
FIG. 1B illustrates an example of a 3D point cloud, according to an embodiment.
Figure 2:
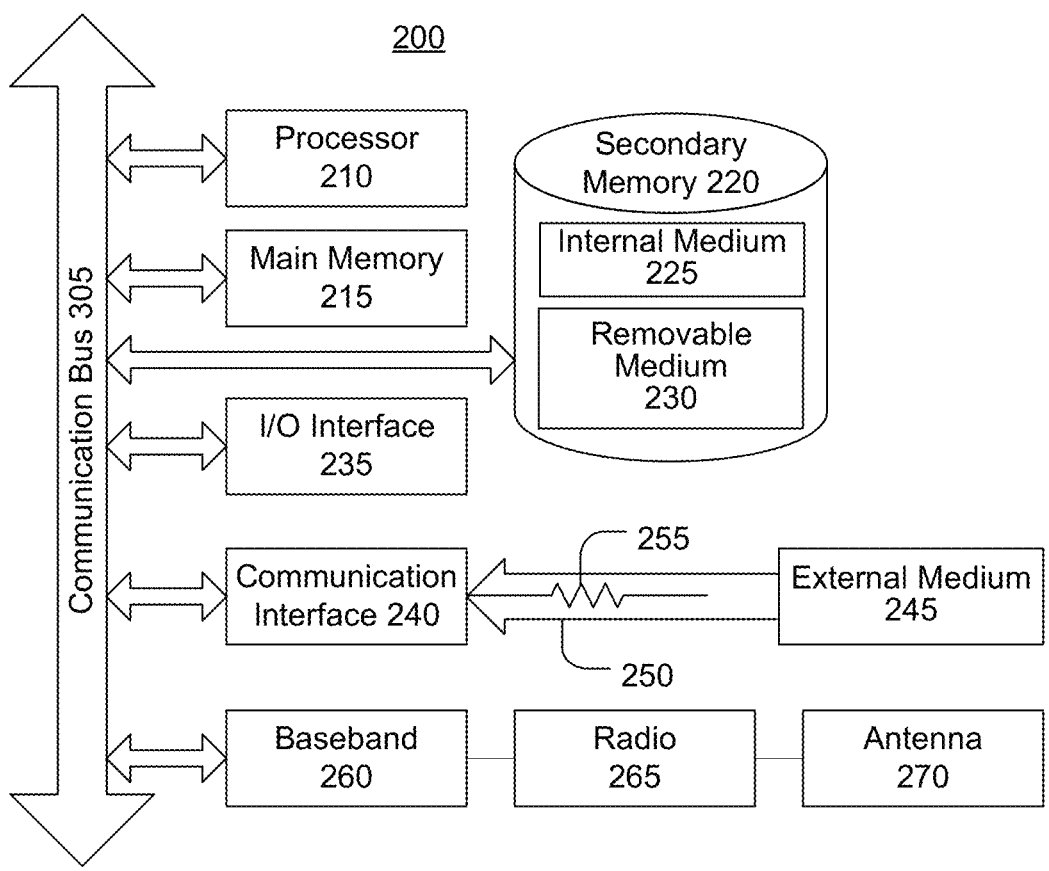
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used as or in conjunction with one or more of the mechanisms, processes, methods, or functions (e.g., to store and/or execute one or more software modules implementing one or more of the disclosed processes, such as process 400 and the clustering algorithm described elsewhere herein). System 200 can be any processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a graphics processing unit (GPU), a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPM), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 (e.g., embedded memory) and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having stored thereon computer-executable code (e.g., disclosed software modules) and/or data. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 include an external hard disk drive, an external optical drive, an external magneto-optical drive, and/or the like. Other examples of secondary memory 220 include semiconductor-based memory such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., software modules implementing one or more processes described herein) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and any other form of software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

1.2. Example Operating Environment

Figure 3:
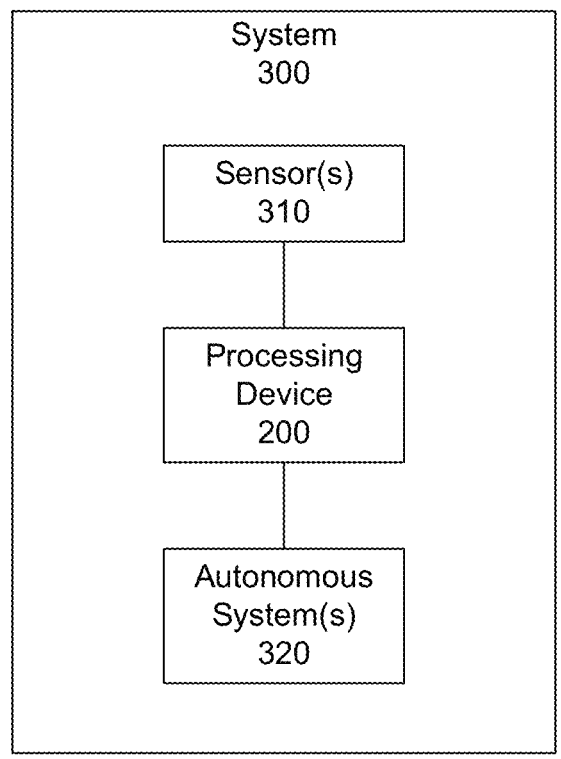
FIG. 3 illustrates an exemplary operational environment for the processing system described in FIG. 2, according to an embodiment.

FIG. 3 illustrates an operating environment of processing device 200, according to an embodiment. In an embodiment, the processes described herein may be implemented by a processing device 200, installed in a system 300. System 300 may be an autonomous vehicle or a human-operated vehicle with autonomous systems. Such a vehicle may include, without limitation, an automobile (e.g., car, truck, motorcycle, scooter, etc.), an aircraft (e.g., airplane, glider, etc.), or any other type of vehicle (e.g., bicycle). Alternatively, system 300 may be a static or non-static robot, or any other system which may require or benefit from an understanding of its physical environment.

Processing device 200 may be communicatively connected (e.g., by wire(s) or wirelessly) to one or more sensor(s) 310 (e.g., Lidar sensor(s), radar(s), camera(s), etc.) that are used to generate a 3D point cloud. For example, sensor(s) 310 may comprise a VLP16™ Lidar sensor from Velodyne LiDAR™ and/or the M8™ Lidar sensor from Quanergy Systems, Inc.™. However, it should be understood that sensor(s) 310 may comprise any sensor whose output can be understood as a 3D point cloud.

Processing device 200 may also be communicatively connected (e.g., by wire(s) or wirelessly) to one or more autonomous system(s) 320 for controlling various elements (e.g., actuators) of system 300. For example, in the case that system 300 is a vehicle, autonomous systems may comprise a steering system (e.g., for steering the wheels of the vehicle), a braking system (e.g., for applying or releasing brakes of the vehicle), an acceleration system (e.g., for throttling the engine of the vehicle), a collision avoidance system (e.g., for steering, braking, and/or accelerating the vehicle so as to avoid a collision with an identified object), and/or the like.

Sensor(s) 310 and/or autonomous system(s) 320 may be communicatively connected to processing device 200 via I/O interface 235, communication interface 240, and/or via antenna 270. Examples of wired connections include, without limitation, Ethernet, a serial port, Universal Serial Bus (USB), and/or the like. Examples of wireless connections include, without limitation, Wi-Fi™, Bluetooth™, Zigbee™, and/or the like.

2. Process Overview

Embodiments of processes for 3D-point-cloud segmentation will now be described in detail. It should be understood that the described processes may be embodied in one or more software modules that are executed by one or more hardware processors (e.g., each comprising processor 210). The described process may be implemented as instructions represented in source code, object code, and/or machine code. These instructions may be executed directly by the hardware processor(s), or alternatively, may be executed by a virtual machine operating between the object code and the hardware processor(s).

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components.

To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

2.1. Sensing and Control

FIG. 4 illustrates a process 400 in which the 3D-point-cloud segmentation is performed, according to an embodiment. While process 400 is illustrated with a specific sequence of steps, in alternative embodiments, process 400 may be implemented with more, fewer, or a different arrangement and/or ordering of steps. In addition, it should be understood that the steps may be performed serially or sequentially, or two or more of the steps may be performed in parallel or simultaneously. Process 400 may be implemented by software, stored in main memory 215 and/or secondary memory 220, and executed by processor 210 of processing device 200, which may be installed in system 300. Alternatively, process 400 could be implemented directly in hardware that is installed in system 300.

In step 410, data is received from one or more sensors (e.g., sensors 310). This data is used to generate a 3D point cloud in step 420. The raw data sensor may comprise, without limitation, a time of flight, distance, return intensity, timestamp, altitude, and/or azimuth angle. A set of these metrics can individually represent a point or some subset of these metrics can represent one or more points, given assumptions such as a fixed sequence of altitude and azimuth angles. Geometric equations, such as those for translating points from a polar coordinate frame to a Cartesian coordinate frame, can be used to generate individual points from the values of these metrics in the raw sensor data. The generated individual points can then be aggregated into a common data structure or sequential location in memory (e.g., main memory 215 and/or secondary memory 220), and passed as an input to a further process. The delineation of one point cloud from another may be software-defined or sensor-defined. The output of step 420 may be a 3D point cloud, which may comprise a list of points with x, y, and z components.

In step 430, the 3D point cloud is segmented (also referred to herein as "clustering"), as described elsewhere herein. The input to the clustering algorithm in step 430 is the 3D point cloud, generated in step 420, which may be represented as a list of points with x, y, and z components. The clustering algorithm receives the 3D point cloud as input, and outputs a list of clusters. Each cluster in the list of clusters may be represented as a list of points with x, y, and z components.

In step 440, objects are identified based on the clusters output from step 430. For example, one or more clusters in the list of clusters may be matched to representations of references objects (e.g., using pattern matching and confidence values). In the case that system 300 is a vehicle, these objects may represent other vehicles (i.e., other than system 300), pedestrians, fixtures (e.g., buildings, medians, curbs, pillars, lampposts, signs, fire hydrants, trees, etc.), parts of the ground (e.g., berms, hills, cliffs, rocks, speed bumps or other bumps, etc.), and/or the like. This object identification can be implemented using explicit rule-based methods (e.g., identifying round objects using a simple metric), data-focused methods (e.g., machine-learning, which may use decision trees, neural networks, support vector machines, etc.), or a combination of both rule-based and data-focused methods (e.g., rule-based features in combination with a machine-learning classifier).

In step 450, one or more autonomous systems (e.g., autonomous systems 320) of system 300 are controlled based on the objects identified in step 440. In general, it should be understood that the autonomous system(s) may be controlled by processing device 200 to navigate the environment, comprising the objects identified in step 440, without colliding with any objects—and/or to minimize the impact of unavoidable collisions with any objects—that are determined to be potentially damaging to system 300. Alternatively or additionally, the autonomous system(s) may be controlled by processing device 200 to navigate the environment so as to make contact with certain objects, within the environment, in a certain manner. For example, in the case that system 300 is a robot, processing device 200 may control the autonomous systems 320 of the robot to avoid certain objects (e.g., humans, walls, obstructions, etc.) while making contact with other objects (e.g., tools that the robot requires for its work, an article of manufacture on which the robot is working, etc.).

2.2. Clustering Algorithm

In an embodiment, the 3D-point-cloud segmentation is performed using a combination of projection-based and range-image-based characteristics. For example, the clustering algorithm, disclosed herein, may use projection and down-sampling to reduce the problem size. Specifically, the clustering algorithm may aggressively down-sample points in the 3D point cloud and completely remove the vertical direction from the 3D point cloud. This reduces the problem size by approximately one order of magnitude, thereby enabling the clustering algorithm to run significantly faster than conventional solutions. In addition, by virtue of being projection-based, the clustering algorithm is able to operate on data from multiple sensor inputs in unison.

From range-image-based algorithms, the clustering algorithm may use a similar, but distinct, notion of a dimensionless association criterion (e.g., the threshold metric described herein). This enables the clustering algorithm to handle data over a wide range of distances.

Furthermore, in an embodiment, core algorithmic improvements are achieved by using a different data structure and introducing aggressive down-sampling (e.g., to remove a basis dimension, grid-based down-sampling, random sampling, etc.) and/or pruning, to thereby improve algorithmic speed. An example of the data structure that may be used is a specialized integer lattice, which supports Euclidean association, and supports $O(1)$ or better queries for associations between points. Using such a data structure provides improvements in the computational complexity (e.g., from $O(n \log n)$ to $O(n)$ or better). The clustering algorithm can also be made static-memory by building all dependencies (e.g., the integer lattice data structure) from the ground up.

In summary, in an embodiment, there are four main characteristics of the clustering algorithm: a parameterized, potentially dynamically calculable, variable association criterion (e.g., an association metric that is parameterized by one or more human-interpretable values and can dynamically vary); an efficient data structure that is capable of handling potentially variable queries for associations between objects (e.g., points) in O(1) time or better; aggressive pruning during the clustering process; and a static-memory implementation.

Due to these characteristics, in an embodiment, the clustering algorithm possesses the following attributes:

Extreme speed: This makes the clustering algorithm suitable for high-speed and real-time applications due to improved runtime.

Scalability: The runtime of the clustering algorithm scales linearly with increases in the problem size, as opposed to linearithmically, while also permitting operation with multiple sensor inputs simultaneously. This makes the clustering algorithm suitable for a wide range of applications at different fidelity scales, including high-fidelity applications with multiple sensor inputs.

Naturalistic segmentation: The use of a parameterized clustering threshold (e.g., the threshold metric described herein), in conjunction with the specialized data structure, provides a natural extension to simple Euclidean clustering with a fixed threshold. In turn, this provides clean and realistic clustering over large distance scales.

Static memory: The clustering algorithm is suitable for embedded and safety-critical applications.

Input agnostic: The clustering algorithm can support data input from multiple sensors (e.g., different models of sensors) simultaneously.

Figure 5A:
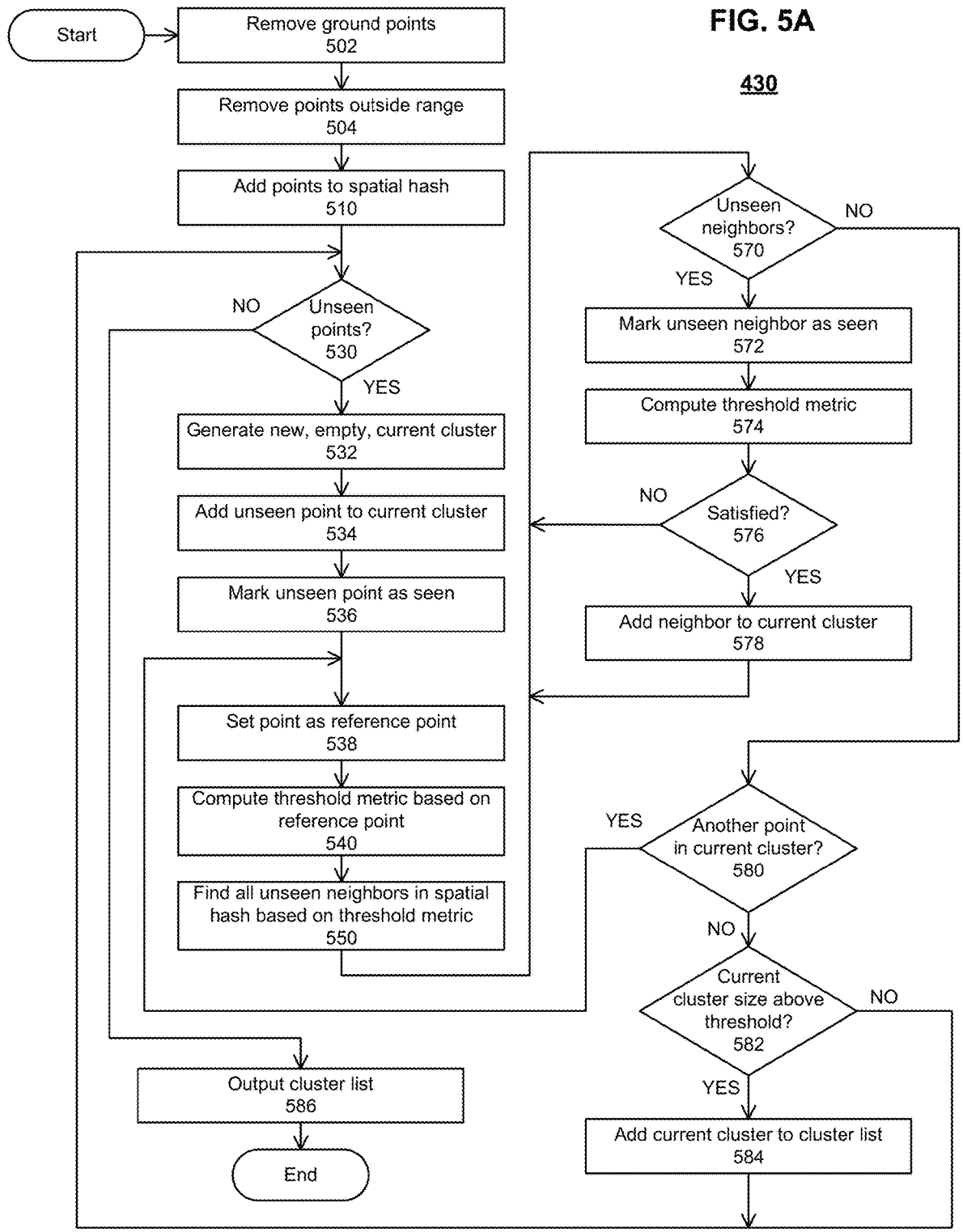
FIGS. 5A-5C illustrate a clustering algorithm for 3D-point-cloud segmentation, according to an embodiment.
Figure 5B:
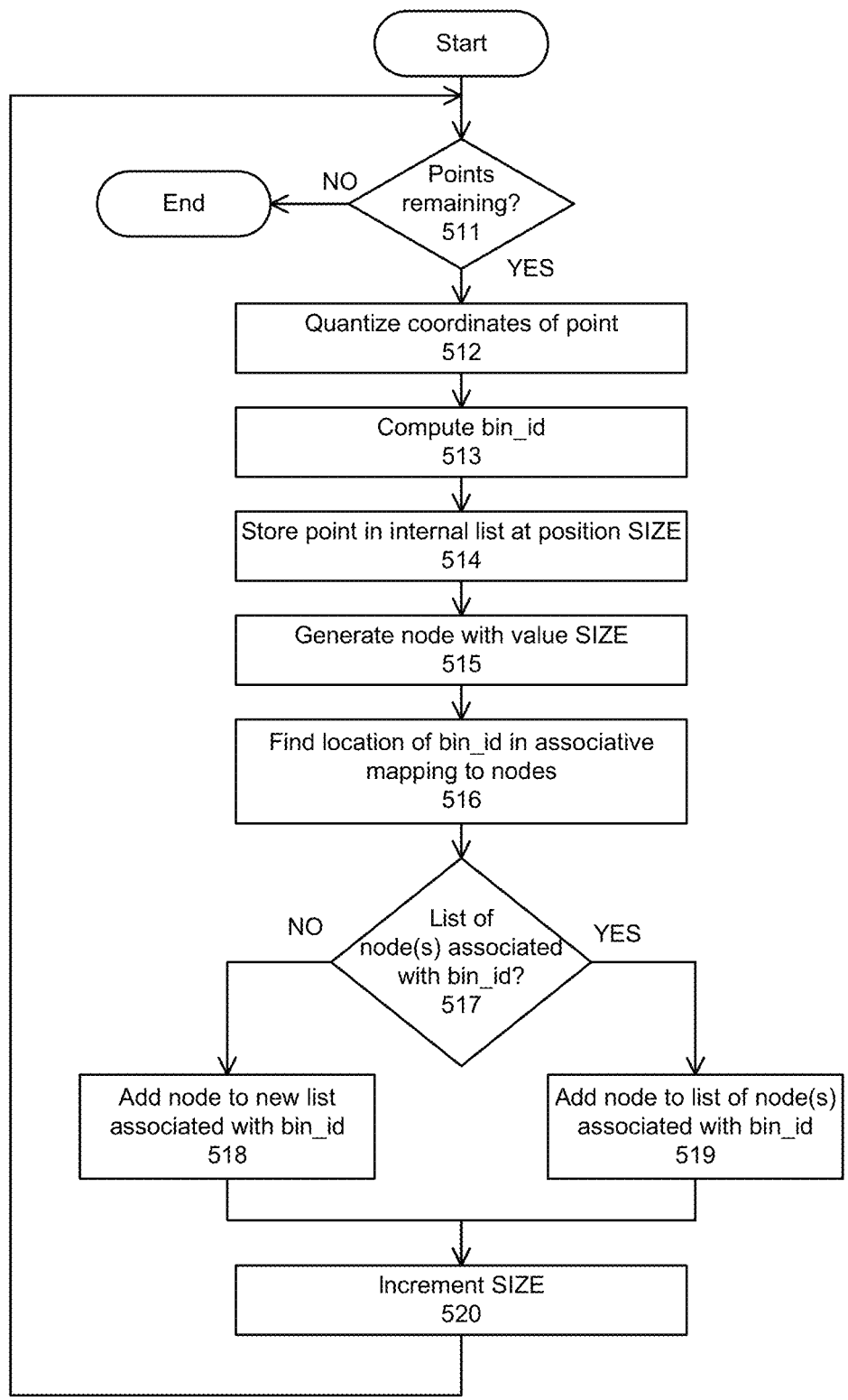
Figure 5C:
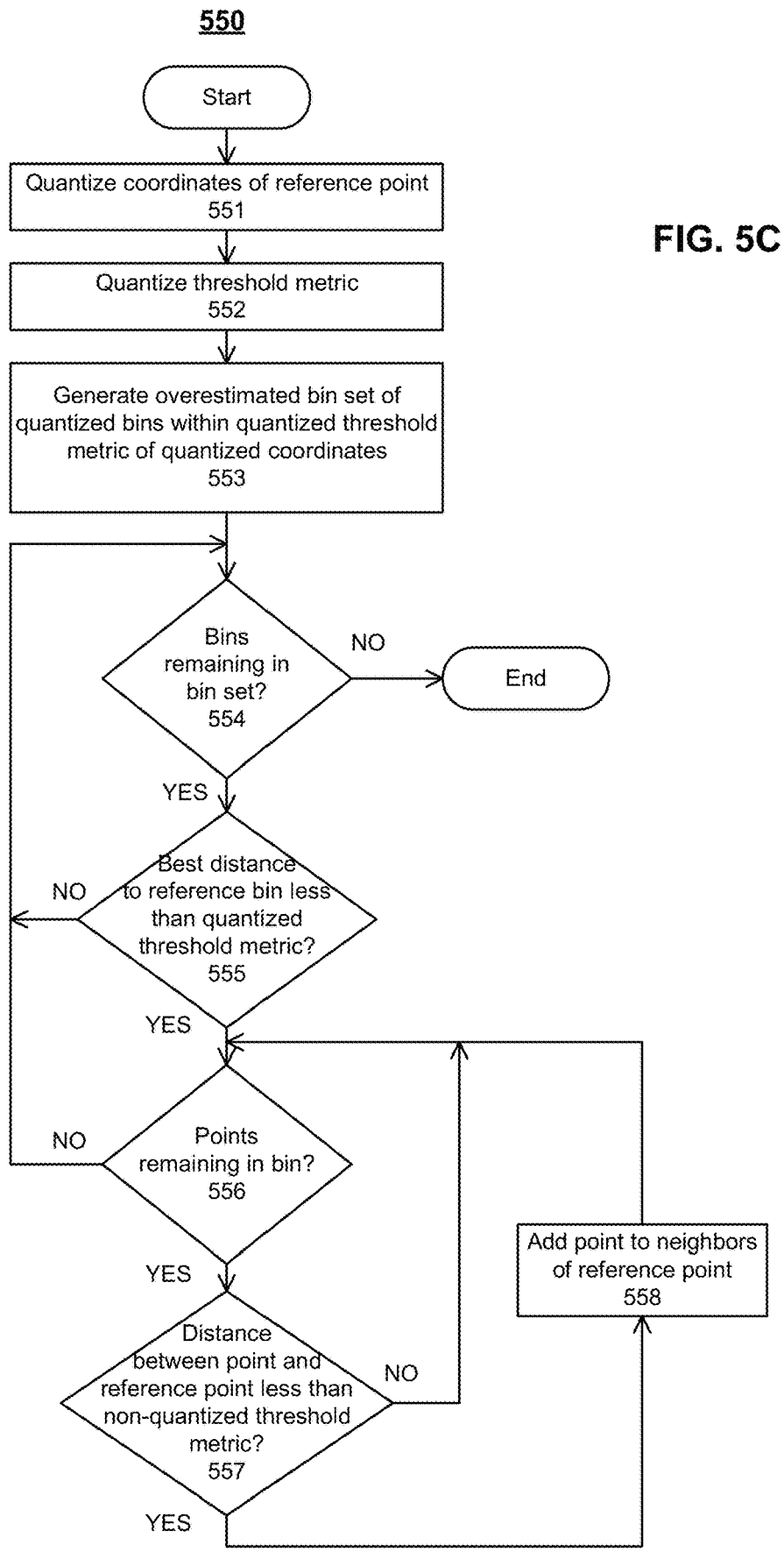

FIGS. 5A-5C illustrate the clustering algorithm, according to an embodiment. The clustering algorithm represents an implementation of step 430 from process 400 in FIG. 4 as its own process. While process 430 is illustrated with a specific sequence of steps, in alternative embodiments, process 430 may be implemented with more, fewer, or a different arrangement and/or ordering of steps. In addition, it should be understood that the steps may be performed serially or sequentially, or two or more of the steps may be performed in parallel or simultaneously. Process 430 may be implemented by software, stored in main memory 215 and/or secondary memory 220, and executed by processor 210 of processing device 200, which may be installed in system 300. Alternatively, process 430 could be implemented directly in hardware that is installed in system 300.

The 3D point cloud is described herein as a list of points, with each point in the 3D point cloud having an x, y, and z coordinate. However, it should be understood that other representations of the 3D point cloud and points may be used.

With reference to FIG. 5A, in step 502, ground points are removed from the 3D point cloud. Ground points may be distinguished from other points via a separate ground plane segmentation. Ground plane segmentation may involve rules to distinguish ground points, such as by calculating a projected distance from an estimated ground plane (e.g., with respect to a fixed point or reference) or by identifying sequences of points that exhibit horizontal structure. Further techniques for ground plane segmentation may include iteratively estimating a best-fit plane to the world, estimating the normal vectors and convexity of each point in the point cloud and filtering points based on distance thresholds with respect to a reference metric, or some combination of these techniques.

In step 504, points outside a predetermined range are removed from the 3D point cloud. In an embodiment, the z coordinate (e.g., representing elevation) may be used to determine whether or not a point is within the range. For example, a z coordinate above a first predetermined value may indicate that the point is irrelevant (e.g., significantly above system 300). Thus, points with z coordinates above the first predetermined value may be removed from the 3D point cloud, in step 504, so that they are not considered in any future steps. Similarly, points with z coordinates below a second predetermined value may be removed from the 3D point cloud in step 504, as an alternative or in addition to the removal of points with z coordinates above the first predetermined value. Advantageously, the removal of points from the 3D point cloud, in this manner, can reduce computational time. It should be understood that steps 502 and 504 represent at least some examples of the down-sampling and/or pruning discussed elsewhere herein.

In step 510, the points, remaining in the 3D point cloud after the pruning in steps 502 and 504, are added to a spatial hash. The spatial hash is a data structure utilized in subsequent steps. An embodiment of step 510 is illustrated in FIG. 5B.

With reference to FIG. 5B, step 510 involves iterating through all points remaining in the 3D point cloud, following the down-sampling and pruning in steps 502 and 504. In step 511, it is determined whether or not there are any points remaining to be considered. If all points have been considered (i.e., "NO" in step 511), step 510 ends, and process 430 proceeds to step 530 with a data structure representing the spatial hash. Otherwise, if at least one point remains to be considered (i.e., "YES" in step 511), the next point is selected for consideration, and the data structure, representing the spatial hash, may be provided to and updated in steps 512-520.

In an embodiment, the data structure for the spatial hash comprises a bin size, size ("SIZE"), y_stride ("y_stride"), and an associative mapping from bin identifiers ("bin_id") to one or more nodes. The bin size represents the level of quantization used in the spatial hash, the size represents the number of points stored in the data structure, and y_stride is a convenience parameter derived from the bin size. As one example, y_stride may be calculated by dividing the width of the data structure for the spatial hash, in the x direction, by the bin size and rounding the result up.

In step 512, the x and y coordinates of the selected point are quantized. For instance, the x and y coordinates of the selected point may be divided by the bin size and rounded down to compute their quantized values. The purpose of this binning is to generate bins, which represent the building blocks of a coarse candidate set. The coarse candidate set provides quick and efficient pruning to significantly reduce the computational burden of neighborhood queries.

In step 513, the bin identifier is computed for the selected point. For instance, the quantized x coordinate value may be added to the product of the quantized y coordinate value and the y_stride value (i.e., x+(y*y_stride)) to generate a single identifier for easy computational representation.

In step 514, the selected point is stored in an internal list at position SIZE. This internal list is a subcomponent of the associative mapping that is maintained for local memory access to the points in the 3D point cloud. SIZE is used so that the node created in subsequent step 515 can correctly refer to the point stored in the internal list in step 514.

In step 515, a node is created with a value of SIZE. The node is used as a proxy representation for a point in a cluster. A node uniquely refers to a point in the 3D point cloud and has additional information that denotes the cluster of which that point is a part. In step 515, the node for a point is initialized, so that the additional information is empty, representing the fact that the represented point has not yet been associated with a cluster. This additional information will be filled into the node in subsequent steps of the clustering algorithm.

In step 516, the location of the bin identifier in the associative mapping to node(s) is found. The use of the associative mapping in this manner provides a computationally inexpensive way to map from a point to neighboring points (e.g., in step 550).

In step 517, it is determined whether or not there is already a list of node(s) associated with the bin identifier. If there is not already a list of node(s) associated with the bin identifier (i.e., "NO" in step 517), process 510 proceeds to step 518. Otherwise, if there is already a list of node(s) associated with the bin identifier (i.e., "YES" in step 517), process 510 proceeds to step 519.

In step 518, a new list is created and associated with the bin identifier in the associative mapping in the data structure, and the node, created in step 515, is added to the new list associated with the bin identifier. In this case, the node, created in step 515, represents the beginning of the list associated with the bin identifier.

In step 519, the node, created in step 515, is added to the existing list of one or more nodes associated with the bin identifier, within the associative mapping in the data structure.

Steps 517-519 provide book-keeping inside the associative mapping. If there is no list to begin with for a particular bin identifier, a new list is created and the node is added to the new list. Otherwise, the node is added to the existing list for a particular bin identifier. After both steps 518 and 519, process 510 proceeds to step 520. In step 520, the value of SIZE is incremented (i.e., indicating that one more point has been added to the data structure), and process 510 returns to step 511.

Returning to FIG. 5A, in step 530, it is determined whether or not any points, which have not already been seen by process 430, remain to be considered. If unseen points remain to be considered (i.e., "YES" in step 530), the next unseen point is selected for consideration, and process 430 proceeds to step 532. Otherwise, if no unseen points remain to be considered (i.e., "NO" in step 530), process 430 proceeds to step 586.

In step 532, a new empty cluster (e.g., represented as a list of points) is created as the current cluster under consideration.

In step 534, the unseen point, selected in step 530, is added to the new cluster, created in step 532. Furthermore, in step 536, this unseen point is marked as seen, so that it is not subsequently reselected in step 530.

In step 538, the point, selected in step 530, added to the new cluster in step 532, and marked as seen in step 536, is set as the reference point for subsequent steps.

In step 540, a threshold metric is computed based on the reference point, set in step 538. Computation of the threshold metric essentially maps the reference point to a number that represents a distance. This number can be compared to threshold metrics for neighboring points to determine if they are truly neighbors. Without loss of generality, this number can be interpreted as the minimum distance or similarity between points before the points are considered neighbors with respect to the reference point.

In step 550, all points are found in the spatial hash, created in step 510, that, based on the threshold metric computed in step 540, are neighbors of the reference point, set in step 538, and which have not yet been seen. An embodiment of step 550 is illustrated in FIG. 5C.

Referring to FIG. 5C, in step 551, the x and y coordinates of the reference point, set in step 538, are quantized. For instance, the x and y coordinates of the reference point may be divided by the bin size and rounded down to compute their quantized values. Step 551 may be similar or identical to step 512.

In step 552, the threshold metric, computed in step 540, is quantized. For instance, the threshold metric may be divided by the bin size and rounded up. The quantized threshold metric may represent a manhattan/L1 distance. The quantized threshold metric is used to perform a coarse, bin-level search, which limits the search complexity to a constant order.

In step 553, an overestimated bin set of quantized bins within a distance, equal to the quantized threshold metric computed in step 552, from the quantized coordinates, computed in step 551, is generated. The overestimated bin set refers to the set of all bins for which the quantized threshold metric is satisfied with respect to a reference bin. Broadly, it represents a tight box that is centered on the reference bin. Simple overestimation is performed, as opposed to exact enumeration, in order to ease the computational burden of step 550.

In step 554, it is determined whether or not any bins remain to be considered in the overestimated bin set, generated in step 553. If at least one bin remains to be considered (i.e., "YES" in step 554), the next bin is selected for consideration, and process 550 proceeds to step 555. Otherwise, if no bins remain to be considered (i.e., "NO" in step 554), step 550 ends, and process 430 proceeds to step 570 with a neighbor list associated with the reference point.

In step 555, it is determined whether or not the best-case distance (e.g., rounded-down distance) from the selected bin to the bin of the reference point is less than the quantized threshold metric. If the best-case distance is less than the quantized threshold metric (i.e., "YES" in step 555), process 550 proceeds to step 556, such that each point in the bin is considered in loop 556-558. Otherwise, if the best-case distance is not less than the quantized threshold metric (i.e., "NO" in step 555), process 550 returns to step 554. The purpose of step 555 is to perform a coarse, bin-level search to quickly generate approximate candidate sets.

In step 556, it is determined whether or not any points remain to be considered in the selected bin. If at least one point in the selected bin remains to be considered (i.e., "YES" in step 556), the next point from the selected bin is selected for consideration, and process 550 proceeds to step 557. Otherwise, if no points in the selected bin remained to be considered (i.e., "NO" in step 556), process 550 returns to step 554.

In step 557, it is determined whether or not the distance between the selected point (i.e., selected in step 556) and the reference point (i.e., set in step 538) is less than the non-quantized threshold metric. If the distance between the selected point and reference point is less than the non-quantized threshold metric (i.e., "YES" in step 557), process 550 proceeds to step 558. Otherwise, if the distance between the selected point and reference point is not less than the non-quantized threshold metric (i.e., "NO" in step 557), process 550 returns to step 556. The purpose of step 557 is to perform a fine-grained comparison on a smaller candidate set to determine if the selected points are truly neighbors to the reference point.

In step 558, the selected point is added as a neighbor of the reference point. For instance, the selected point may be added to a neighbor list associated with the reference point. The neighbor list for a given reference point may comprise a list of points that have been determined to be neighbors to that reference point.

In an embodiment, step 550 produces a neighbor list for the reference point, set in step 538, that is used by step 570.

Returning to FIG. 5A, in step 570, it is determined whether or not any neighbor points (e.g., in the neighbor list, associated with the reference point, output by step 550), which have not already been seen, remain to be considered. If unseen neighbor points remain to be considered (i.e., "YES" in step 570), the next unseen neighbor point is selected for consideration, and process 430 proceeds to step 572. Otherwise, if no unseen neighbor points remain to be considered (i.e., "NO" in step 570), process 430 proceeds to step 580.

In step 572, the selected neighbor point is marked as seen, so that it is not subsequently reselected in steps 530 and 570.

In step 574, a threshold metric is computed for the selected neighbor point.

In step 576, it is determined whether or not the threshold metric, computed for the selected neighbor point in step 574, satisfies the threshold metric, computed for the reference point in step 540. If the threshold metrics are satisfied (i.e., "YES" in step 576), process 430 proceeds to step 578. Otherwise, if the threshold metrics are not satisfied (i.e., "NO" in step 576), process 430 returns to step 570.

The purpose of steps 574 and 576 is to determine if bidirectional neighborhood consensus is achieved. Specifically, computation will only continue if both the reference point considers the selected neighbor point to be close enough with respect to the reference point's threshold metric, and the selected neighbor point considers the reference point to be close enough with respect to the selected neighbor point's threshold metric. Without loss of generality, satisfaction of a threshold metric means that the threshold metric is below some threshold value. If the threshold metrics are satisfied, then computation continues for the selected neighbor point. Otherwise, the selected neighbor point will be skipped to save on further computation (i.e., "gate" computation).

In step 578, the selected neighbor point is added to the current cluster, generated in step 532, and process 430 returns to step 570.

At the beginning of step 580, all points that qualify as neighbors of the reference point have been added to the cluster generated in step 532. Accordingly, in step 580, it is determined whether or not there is another point to be considered in the current cluster (e.g., a first neighbor of the current reference point that has not yet been considered as a reference point). If another point remains to be considered as the reference point in the current cluster (i.e., "YES" in step 580), the next point is selected for consideration, and process 430 returns to step 538, to set the selected next point as the new reference point. Otherwise, if no point remains to be considered as the reference point in the current cluster, process 430 proceeds to step 582. More generally, the current cluster can be thought of as a flat list of points. Given some point, in the middle of the list, currently being used as the reference point, all points in the list, before that given point, have had their neighbors found (e.g., via steps 538-578), whereas all points in the list, after that given point, still need to have their potential neighbors checked. Thus, if any points remain in the list, after the current reference point, the next point in the list is selected in step 580 and set as the reference point in step 538, so that all of its potential neighbors may be checked in steps 540-578.

In step 582, it is determined whether or not the size of the current cluster, generated in step 532, has exceeded a threshold size. If the current cluster's size has exceeded the threshold size (i.e., "YES" in step 582), process 430 proceeds to step 584. Otherwise, if the current cluster's size has not exceeded the threshold size (i.e., "NO" in step 582), process 430 returns to step 530.

In step 584, the current cluster, generated in step 532, is added to a running cluster list. The cluster list comprises one or more clusters. Each of these clusters in the cluster list comprises one or more points representing that cluster. Once the current cluster has been added to the cluster list, process 430 returns to step 530.

Once all unseen points have been considered in step 530, process 430 proceeds to step 586. In step 586, the cluster list, to which one or more clusters have been added in step 584, is output (e.g., for post-processing, such as object identification in step 440 of process 400).

Figure 6A:
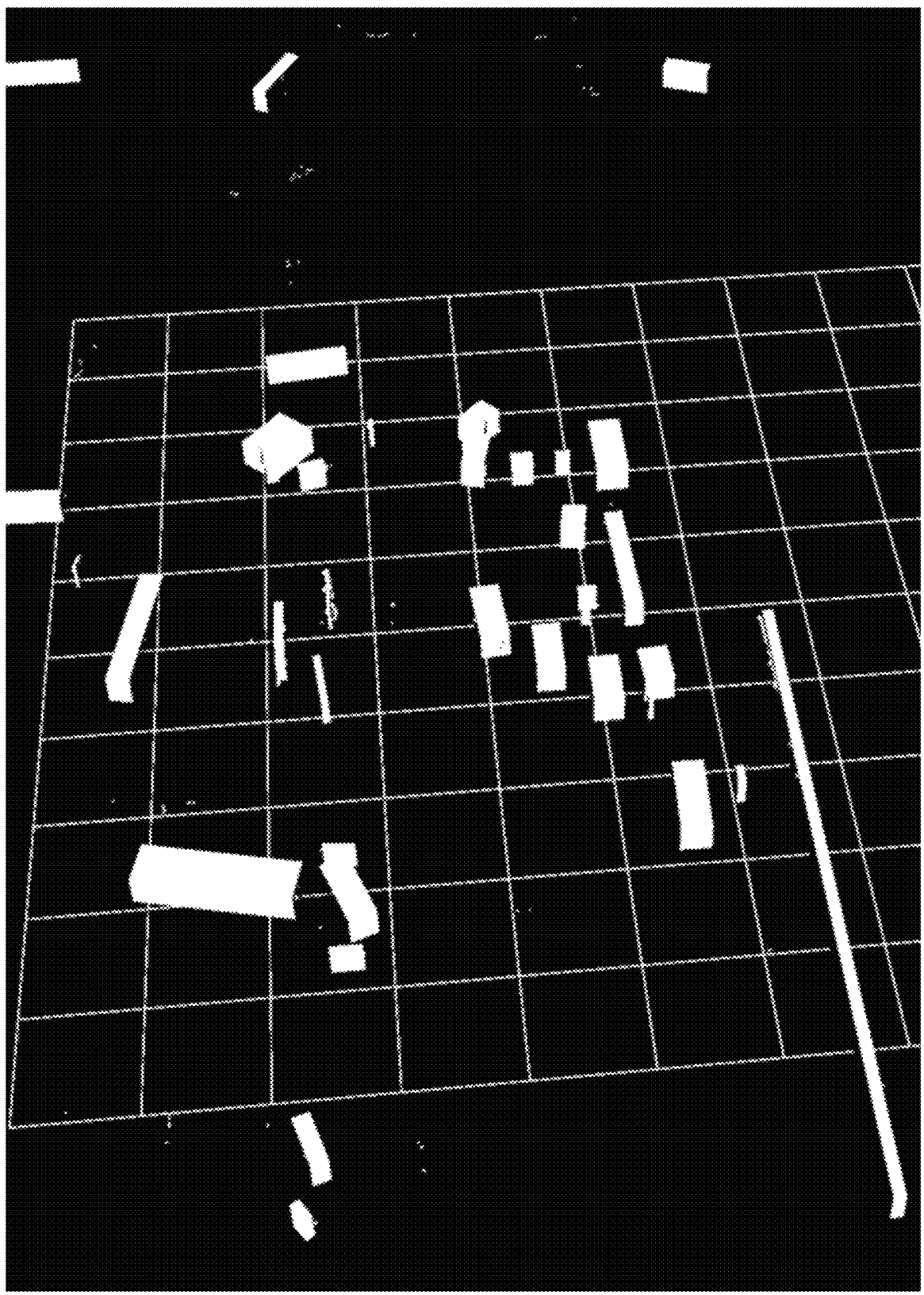
FIGS. 6A and 6B illustrate post-processed results of the clustering algorithm illustrated in FIGS. 5A-5C, according to an embodiment.
Figure 6B:
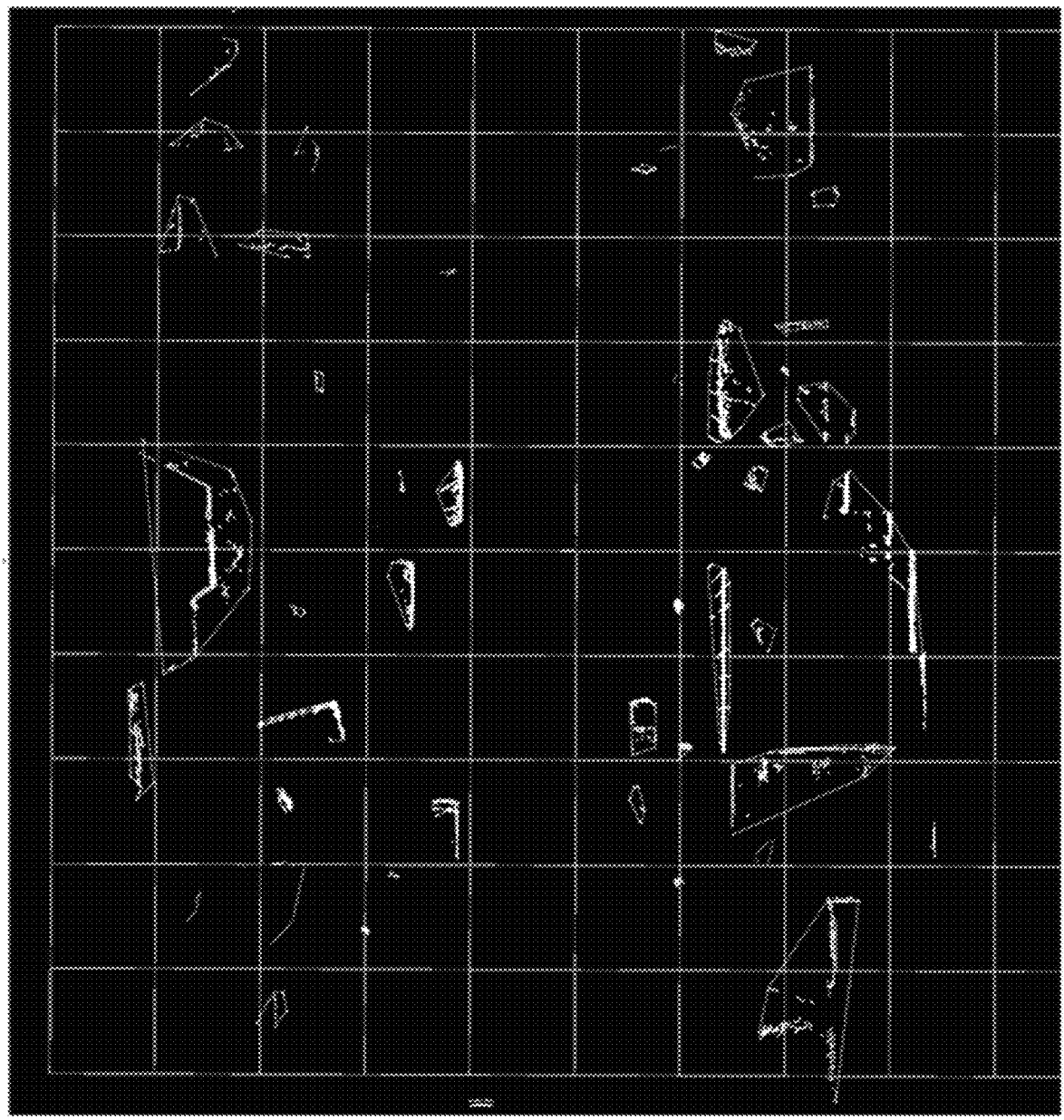

FIGS. 6A and 6B illustrate examples of post-processing after segmentation in step 430 of process 400. Each box in FIG. 6A corresponds to a distinct cluster. Similarly, each box in FIG. 6B corresponds to a distinct cluster, surrounded by its convex hull, as determined in the post-processing.

2.3. Example Applications

While primarily described with respect to autonomous vehicles, the disclosed clustering algorithm may be used in any application which requires or may benefit from segmentation. In general, the output of the clustering algorithm is a numerical representation of contiguous objects in the physical environment, without the sensor noise and signal pre-processing errors found in conventional algorithms.

An understanding of the clusters in the physical environment (i.e., what points in 3D space correspond to what objects) may be used to empower any one or more of the following for each object: estimation and/or classification of the object (e.g., a pedestrian, vehicle, fixture, etc.); estimation of the boundaries of the object; tracking the object's state (e.g., size, position, velocity, acceleration, label, etc.); and/or prediction of the object's future state using one or more of these estimates. Such post-processing of the clustering algorithm's output (e.g., list of clusters) provide a concrete understanding of what objects are in the environment, where those objects are in the environment, and where those objects will be in the environment in the future (e.g., within a short time horizon).

This concrete understanding of the objects in the environment may, in turn, empower a number of applications for systems that interact with the physical world. Such applications include, without limitation:

Trajectory Planning: post-processing may be performed on the output of the clustering algorithm to predict more precise and naturalistic trajectories of the objects represented in the output of the clustering algorithm. For instance, the output of the clustering algorithm may be used for additional signal processing, which may result in a nominal reference trajectory that a controller (e.g., of system 300) will attempt to follow. Specifically, the controller may connect to a microcontroller which commands a series of actuations to follow the reference trajectory. These actuations may include, without limitation, applying torque to a steering column to affect the angle of the wheels of a vehicle (e.g., system 300) with the road, applying linear actuation to a throttle to increase the amount of fuel supplied to the internal combustion engine of the vehicle (e.g., thereby increasing rotary force applied to the wheels, rotors, turbines, etc. of the vehicle), and/or actuation of other control surfaces (e.g., ailerons of an airborne vehicle). The result of such a series of actuation commands may be system 300 moving and changing state in a manner that is consistent with the system's objective with respect to obstacles within the environment. This can include moving with respect to objects, identified using the clustering algorithm, such that there is at least some minimum distance, clearance, or displacement with respect to an object, or moving with respect to an object such that contact is made in some manner.

Intruder Detection: post-processing may be performed on the output of the clustering algorithm to determine when an unauthorized actor is present in a restricted space (e.g., a keep-out zone around an aircraft, an entrance to a building, etc.) of the environment. The restricted space may be either statically defined or dynamically defined. If an unauthorized actor is detected, the system may notify a human operator or perform an automated response (e.g., automatically turning on lights, sounding an alarm, etc.). The notification may comprise or be initiated by an electronic signal, which may travel via one or more communication interfaces (e.g., using network protocols such as User Datagram Protocol (UDP), Transmission Control Protocol (TCP), Internet Protocol (IP), serial bus, etc.), and be interpreted by any appropriate hardware interface(s) and software, if appropriate.

Obstruction Detection: post-processing may be performed on the output of the clustering algorithm to actuate components of a system (e.g., industrial, indoor, or low-powered robots) to safely stop when an obstruction (e.g., human) is detected in its working environment. Such stopping may be commanded by a change in the planned trajectory, as described with respect to trajectory planning, and may be enacted by an electronic signal sent directly to additional hardware (e.g., a relay) to cut power and/or by command signals to actuation hardware used by the system.

Mapping: post-processing may be performed on the output of the clustering algorithm to pre-identify structures and/or other features of interest in the environment for a human operator or subsequent processing. These identified features can be used to generate a map for localization, landmark detection, and/or the like. Such a map may provide an autonomous or human-operated system 300 with a concrete (e.g., numerical) representation or understanding of the system's position in the world. Alternatively or additionally, the map could be used to a priori understand where obstructions are, for example, to empower trajectory planning and/or obstruction detection. As another example, the generated map itself could be the end product for human consumption, to provide simplified, pre-processed, and/or filtered views of a highly complex environment to improve human understanding of the environment.

The properties of the disclosed clustering algorithm also make it suitable for specialized applications with unique requirements. For instance, the ability to be implemented using static memory, makes the clustering algorithm uniquely suited for use in embedded and/or safety-critical application. In addition, the increased speed—and thus, lower latency—of the disclosed clustering algorithm makes it uniquely suited for high-speed (e.g., real-time) applications. Furthermore, the improved efficiency of the disclosed clustering algorithm (e.g., via aggressive down-sampling and pruning) makes the clustering algorithm sufficiently lightweight to be run on a single computer core, and therefore, uniquely suited for low-power applications.

Consequently, the disclosed clustering algorithm is well suited for any context in which 3D point cloud processing is required or beneficial, and is uniquely suited for any high-speed, embedded, safety-critical, low-power, and/or multiple-sensor applications. Such applications include, without limitation, security (e.g., security cameras), automotive (e.g., assisted driving), aerospace (e.g., active scanning), and/or indoor and/or low-power-robotics applications.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising using at least one hardware processor to, over one or more iterations:
    segment a three-dimensional point cloud using a clustering algorithm by, for each unseen point in the three-dimensional point cloud,
        generating a new cluster,
        adding the unseen point to the cluster,
        marking the unseen point as seen, and,
        for each point that is added to the cluster,
            setting the point as a reference point,
            computing a reference threshold metric for the reference point,
            identifying all unseen neighbor points to the reference point in a spatial hash, based on the reference threshold metric, by
                quantizing coordinates of the reference point,
                quantizing the reference threshold metric into a distance metric,
                generating an overestimated bin set of bins that are within the distance metric from the quantized coordinates of the reference point, and,
                for each bin in the overestimated bin set,
                    determining whether or not a best distance of the bin from a reference bin, comprising the reference point, is less than the distance metric, and,
                    when the best distance of the bin from the reference bin is determined to be less than the distance metric, for each point in the bin, determining whether or not a distance between the point in the bin and the reference point is less than the reference threshold metric, and, when the distance between the point in the bin and the reference point is determined to be less than the reference threshold metric, identifying the point in the bin as a neighbor point to the reference point, and, for each identified unseen neighbor point to the reference point, marking the unseen neighbor point as seen, determining whether or not the neighbor point should be added to the cluster, and, when the neighbor point is determined to be added to the cluster, adding the neighbor point to the cluster, and, when a size of the cluster reaches a threshold, adding the cluster to a cluster list;

identify one or more objects based on the cluster list; and control one or more autonomous systems based on the identified one or more objects.

2. The method of claim 1, wherein the method further comprises using the at least one hardware processor to, prior to segmenting the three-dimensional point, remove points outside a predefined range from the three-dimensional point cloud.

3. The method of claim 2, wherein each point comprises an x, y, and z coordinate, wherein the x and y coordinates represent a horizontal plane, wherein the z coordinate represents a vertical axis, and wherein removing points outside a predefined range comprises removing all points that have a z coordinate that has a value outside a predefined range of values.

4. The method of claim 1, wherein the method further comprises using the at least one hardware processor to, for each of the one or more iterations, prior to segmenting the three-dimensional point, remove ground points from the three-dimensional point cloud.

5. The method of claim 1, further comprising using the at least one hardware processor to, for each of the one or more iterations:

receive data from one or more sensors; and generate the three-dimensional point cloud from the data received from the one or more sensors.

6. The method of claim 5, wherein the one or more sensors comprise a plurality of sensors.

7. The method of claim 5, wherein the one or more sensors comprise a light detection and ranging (Lidar) sensor.

8. The method of claim 1, wherein the one or more autonomous systems are comprised in a vehicle.

9. The method of claim 8, wherein the one or more autonomous systems comprise a braking system for applying brakes to one or more wheels of the vehicle.

10. The method of claim 8, wherein the one or more autonomous systems comprise a steering system for steering one or more wheels of the vehicle.

11. The method of claim 8, wherein the one or more autonomous systems comprise an acceleration system for throttling an engine of the vehicle.

12. The method of claim 1, wherein the one or more autonomous systems are comprised in a robot.

13. The method of claim 1, further comprising using the at least one hardware processor to segment the three-dimensional point cloud using the clustering algorithm by further adding points from the three-dimensional point cloud to the spatial hash.

14. The method of claim 13, wherein adding points from the three-dimensional point cloud to the spatial hash comprises associating each point in the three-dimensional point cloud with one of a plurality of bins based on quantized coordinates of the point.

15. The method of claim 1, wherein the one or more iterations comprise a plurality of iterations, and wherein each iteration uses less than or equal to a fixed maximum amount of memory.

16. The method of claim 1, wherein the determination of whether or not the neighbor point should be added to the cluster is based on a neighbor threshold metric that is computed for the neighbor point.

17. The method of claim 1, wherein quantizing coordinates of the reference point comprises dividing the coordinates by a bin size.

18. The method of claim 17, wherein quantizing the reference threshold metric comprises dividing the threshold metric by the bin size.

19. A system comprising:

at least one hardware processor; and one or more software modules that are configured to, when executed by the at least one hardware processor, over one or more iterations, segment a three-dimensional point cloud using a clustering algorithm by, for each unseen point in the three-dimensional point cloud, generating a new cluster, adding the unseen point to the cluster, marking the unseen point as seen, and, for each point that is added to the cluster, setting the point as a reference point, computing a reference threshold metric for the reference point, identifying all unseen neighbor points to the reference point in a spatial hash, based on the reference threshold metric, by quantizing coordinates of the reference point, quantizing the reference threshold metric into a distance metric, generating an overestimated bin set of bins that are within the distance metric from the quantized coordinates of the reference point, and, for each bin in the overestimated bin set, determining whether or not a best distance of the bin from a reference bin, comprising the reference point, is less than the distance metric, and, when the best distance of the bin from the reference bin is determined to be less than the distance metric, for each point in the bin, determining whether or not a distance between the point in the bin and the reference point is less than the reference threshold metric, and, when the distance between the point in the bin and the reference point is determined to be less than the reference threshold metric, identifying the point in the bin as a neighbor point to the reference point, and, for each identified unseen neighbor point to the reference point, marking the unseen neighbor point as seen, determining whether or not the neighbor point should be added to the cluster, and, when the neighbor point is determined to be added to the cluster, adding the neighbor point to the cluster, and, when a size of the cluster reaches a threshold, adding the cluster to a cluster list, identify one or more objects based on the cluster list, and control one or more autonomous systems based on the identified one or more objects.

20. A non-transitory computer-readable medium having instructions stored therein, wherein the instructions, when executed by a processor, cause the processor to, over one or more iterations:

segment a three-dimensional point cloud using a clustering algorithm by, for each unseen point in the three-dimensional point cloud,
generating a new cluster,
adding the unseen point to the cluster,
marking the unseen point as seen, and,
for each point that is added to the cluster,
setting the point as a reference point,
computing a reference threshold metric for the reference point,
identifying all unseen neighbor points to the reference point in a spatial hash, based on the reference threshold metric, by
quantizing coordinates of the reference point,
quantizing the reference threshold metric into a distance metric,
generating an overestimated bin set of bins that are within the distance metric from the quantized coordinates of the reference point, and,
for each bin in the overestimated bin set,
determining whether or not a best distance of the bin from a reference bin, comprising the reference point, is less than the distance metric, and,
when the best distance of the bin from the reference bin is determined to be less than the distance metric, for each point in the bin, determining whether or not a distance between the point in the bin and the reference point is less than the reference threshold metric, and, when the distance between the point in the bin and the reference point is determined to be less than the reference threshold metric, identifying the point in the bin as a neighbor point to the reference point, and,
for each identified unseen neighbor point to the reference point,
marking the unseen neighbor point as seen,
determining whether or not the neighbor point should be added to the cluster, and,
when the neighbor point is determined to be added to the cluster,
adding the neighbor point to the cluster, and,
when a size of the cluster reaches a threshold, adding the cluster to a cluster list;
identify one or more objects based on the cluster list; and
control one or more autonomous systems based on the identified one or more objects.

* * * * *